Dec. 1, 1953         C. P. McCLELLAND         2,660,894
WINDSHIELD WIPER DRIVE APPARATUS
Filed Nov. 17, 1950                              2 Sheets-Sheet 1

Inventor
Clarence P. McClelland
By Willits, Helwig & Baillio
Attorneys

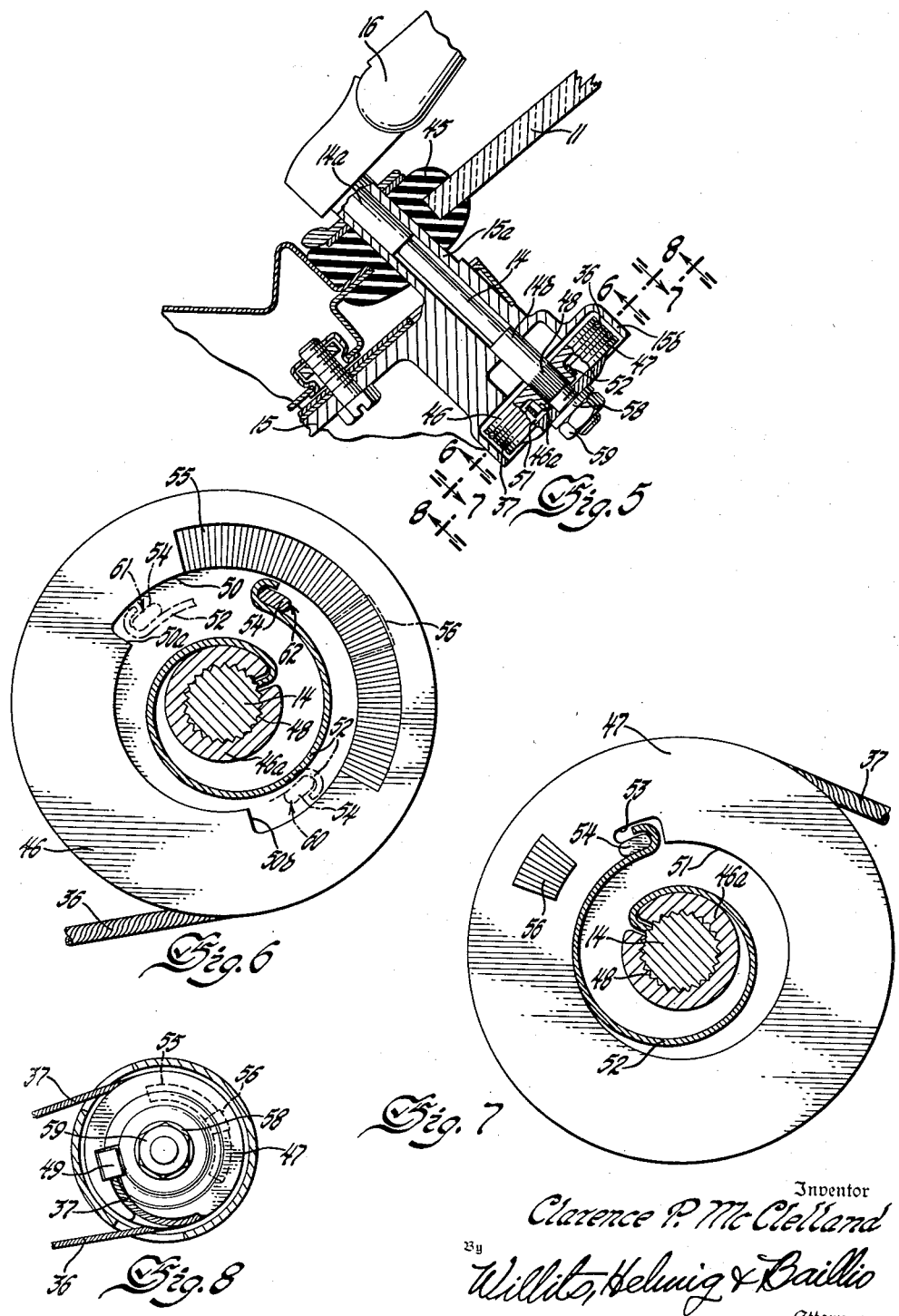

Patented Dec. 1, 1953

2,660,894

UNITED STATES PATENT OFFICE 2,660,894

WINDSHIELD WIPER DRIVE APPARATUS

Clarence P. McClelland, Royal Oak, Mich., assignor to General Motors Corporation, Detroit, Mich., a corporation of Delaware Application November 17, 1950, Serial No. 196,268

10 Claims. (Cl. 74—95)

This invention relates to windshield wiper drive apparatus, and more particularly to tensioning means for the flexible drive cables which extend between the wiper motor and the wiper operating shafts.

One feature of the invention is that it provides improved tensioning means for the flexible drive cables which extend between the windshield wiper motor and the wiper operating shafts; another feature of the invention is that it provides tensioning means which permit play in the flexible cables extending between the motor and the wiper operating shafts during installation of the apparatus, and which act to tighten the cables after installation is completed; a further feature of the invention is that the tensioning means are normally locked and may readily be released to take up any slack in the cables after a period of operation; still another feature of the invention is that it provides primary cable tensioning means connected to the power transmitting cables at one end thereof and secondary cable tensioning means connected to said cables at the other end thereof; yet a further feature of the invention is that the strength of the primary cable tensioning means is several times the strength of the secondary cable tensioning means to maintain the secondary means under tension; and an additional feature of the invention is that the primary cable tensioning means comprises a first pulley fixedly mounted on the wiper operating shaft and connected to one cable, a second pulley rotatably mounted on said shaft adjacent said first pulley and connected to the other of said cables, spring means interconnecting said pulleys for causing relative rotation therebetween to tighten said cables, and readily releasable means for locking the rotatable pulley to the fixed pulley.

Figure 1:
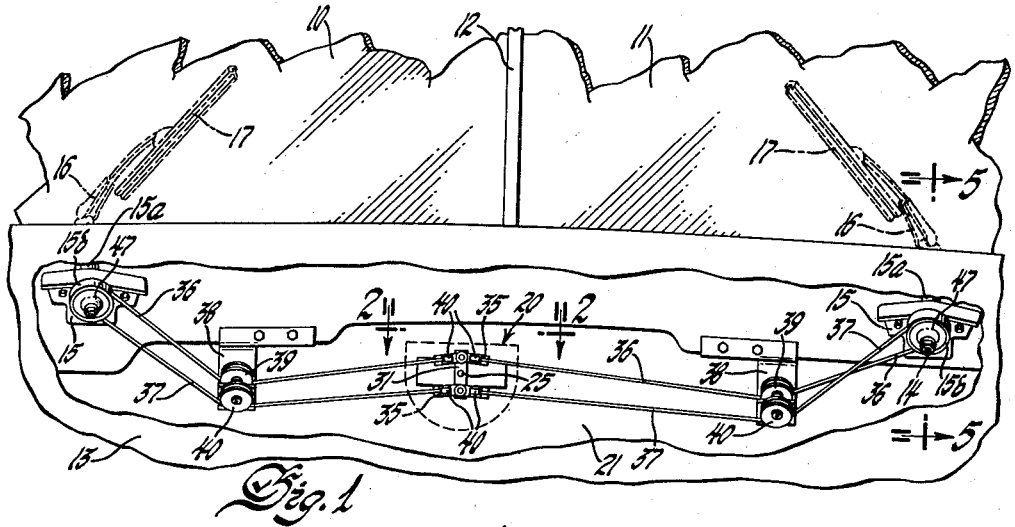
Figure 2:
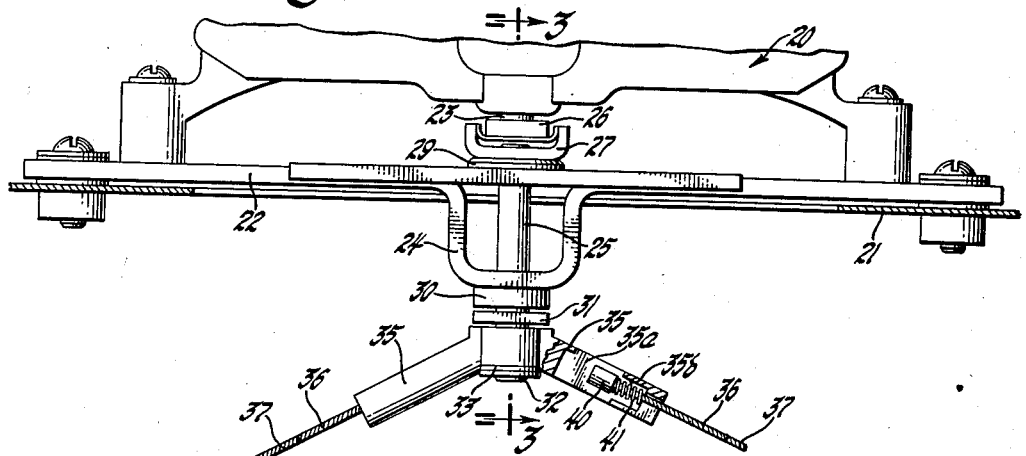
Figure 3:
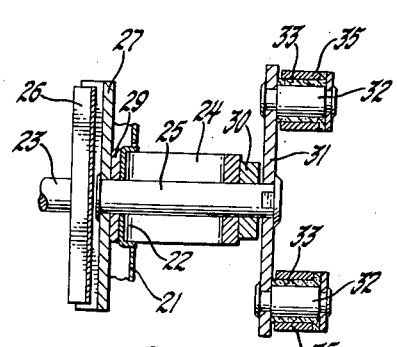
Figure 4:
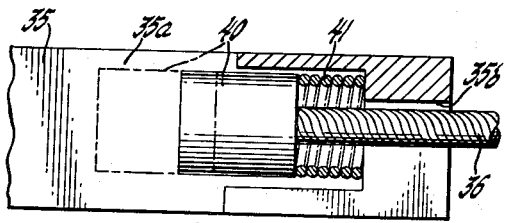

Other features and advantages of the invention will be apparent from the following description, and from the drawings in which:

Figure 1 is a fragmentary elevational view of a portion of the dash panel and windshield of an automobile, parts being broken away to show the improved windshield wiper drive apparatus; Figure 2 is an enlarged fragmentary section taken along the line 2—2 of Figure 1; Figure 3 is a section taken along the line 3—3 of Figure 2; Figure 4 is a further enlarged detail view of a portion of the apparatus of Figure 2; Figure 5 is an enlarged section taken along the line 5—5 of Figure 1; Figure 6 is a further enlarged section taken along the line 6—6 of Figure 5; Figure 7 is a section along the line 7—7 of Figure 5, Figures 6 and 7 being taken along the same line but looking in opposite directions; and Figure 8 is a section along the line 8—8 of Figure 5.

Windshield wipers which are installed in automobiles and other vehicles are operated by a motor which usually is positioned some distance from the wiper blades, particularly when the motor operates a blade on each half of the windshield, and power transmitting means in the form of flexible cables are provided and extend between the motor and the shaft which operates the wiper blade. In order to install the apparatus it is desirable that the cables have some play so that the parts may be properly positioned. However, once the apparatus is installed, it is necessary that the cables be taut in order that power from the motor may efficiently be transmitted to the wiper operating shaft. It is also desirable that some means be provided for taking up slack which may develop in the cables after a period of use, and it is often desirable to provide a continuous tensioning force on the cables, particularly if the cables do not extend directly from the motor to the wiper operating shaft, but extend over idler pulleys. In this event, movement of the wiper blade while the motor is inoperative, or stopping the wiper blade while the motor is operative, would slacken the cable so that the cable might slip from the idler pulley unless an automatic, continuous tensioning means were provided.

The present invention provides improved primary cable tensioning apparatus comprising a pair of pulleys positioned in adjacent relationship on the power means, here shown as being positioned on the wiper operating shaft. One pulley is fixed to the shaft while the other pulley is rotatable thereon, and the pulleys are provided with complementary recesses forming a chamber in which is positioned a spiral spring having one end secured to one pulley and the other end secured to the other pulley. One end of each cable is secured to one of the respective pulleys, and the pulleys may be rotated relative to each other to put the spring under tension. The pulleys are then locked against relative rotation and the drive apparatus may be installed in a vehicle while the cables are slack. Releasing the locking means will cause the spring to unwind, rotating the pulleys relative to each other to take up the slack in the cables, and the locking means may then be tightened. If, after a period of operation, the cables become slack, the locking means may again be loosened to cause the spring to unwind further to take up the additional slack.

In installations in which the power transmitting cables extend directly from the motor to the wiper operating shaft, the primary tensioning means described above are sufficient in themselves. If, however, the cables extend over idler pulleys it is often desirable to provide a secondary tensioning means to exert a constant tensioning force of a strength less than the strength of the primary tensioning means.

Referring now more particularly to the drawings, the invention is illustrated as being installed in a vehicle having a two-part windshield including glass panels 10 and 11 separated by a center partition 12. The windshield is positioned above a dash panel 13, part of which is broken away in Figure 1 in order better to illustrate the windshield wiper drive apparatus. Each panel of the windshield is provided with a separate wiper, and inasmuch as the mechanisms are similar, only the drive mechanism for one of the wipers will be described in detail. Duplicate parts of the other mechanism will be designated by the same reference character as that used to designate the mechanism being described.

On one side of the windshield a shaft 14 is mounted in a bearing and support plate 15 which is secured, as by bolts, to the vehicle body. The shaft 14 extends outside the body and has an arm 16 mounted on the end thereof, and a windshield wiper blade 17 is mounted on the arm 16 in conventional manner.

A windshield wiper motor 20 which may be of the conventional oscillating type is mounted near the transverse center of the vehicle on the fire wall 21 by means of a bracket 22 which is bolted to the fire wall. The bracket 22 has a center aperture aligned with the motor shaft 23, and a bearing support 24 is provided to support a stub shaft 25. The motor shaft 23 has at its rear end a block 26 forming one part of a universal connection, the other part comprising a U-shaped member 27 mounted on the forward end of the stub shaft 25 with its arms adjacent opposite sides of the block 26 to provide a simple universal type drive. Spacer washers 29 and 30 are mounted on the shaft 25 adjacent opposite ends thereof, and at the rear end of the shaft is mounted a motor operating or rocker arm 31 having a pin 32 riveted at each end thereof. A bushing 33 is provided on each of the pins 32, these bushings preferably being formed of porous metal which is impregnated with oil so that the bushing is self lubricating. The bushings provide pivotal mounting means for connecting fingers 35.

Referring again to Figure 1, a pair of cables 36 and 37 extend between the fingers on each side of the motor operating arm 31 and the wiper shaft 14. When two individual wipers are provided as shown in Figure 1, the cables on one side are crossed to provide for asymmetrical operation of the wipers. A bracket 38 is bolted to the fire wall 21 and supports idler pulleys 39 or 40, the cable 36 being guided by the idler pulley 39 and the cable 37 being guided by the idler pulley 40.

In order to provide an automatic tensioning means to prevent the cables from slipping off the idler pulleys, the cables are not connected directly to the respective fingers 35 but, as shown in Figures 2 and 4, are connected through springs which provide a tensioning means. Each of the fingers 35 has an interior chamber 35a which opens into the outer end of the finger through a passage 35b. The cable extends through the passage into the chamber and has secured to its end an abutment member 40. A compression spring 41 surrounds the cable and abuts the bottom wall of the chamber at one end and the member 40 at the other end. In Figure 2 the parts are shown with the spring 41 under only partial compression, as when the spring is taking slack out of the cable 36; and in Figure 4 the spring is shown in compressed position, which is its normal position as will hereinafter appear.

Figure 5 shows in detail the mounting of the wiper operating shaft 14 and the primary tensioning means carried thereby. A portion 15a of the mounting plate 15 provides a sheath for the shaft 14, enlarged portions 14a and 14b near opposite ends of the shaft providing bearings in the sheath 15a. The sheath 15a extends through a rubber mounting and sealing member 45 which carries the windshield panel 11. Extending rearwardly from the member 15 is a cup-shaped housing 15b for receiving a pair of pulleys 46 and 47 which are mounted on the shaft 14. The forward pulley 46 has a hub portion 46a which is force-fit on a splined portion 48 of the enlarged shaft portion 14b so that the pulley 46 is fixedly mounted on the shaft. The rear pulley 47 is positioned adjacent the pulley 46, and is rotatable on the shaft 14. The cable 36 extends partially around and is secured to the pulley 46, and the cable 37 extends partially around and is secured to the pulley 47. As shown in Figure 8 in connection with pulley 47, each pulley has a channel formed in its face to receive the cable, and an abutment member 49 on the cable secures the end of the cable to the pulley.

The pulleys 46 and 47 are provided in their inner faces with complementary recesses 50 and 51, these recesses forming a chamber when the pulleys are positioned in abutting relation as shown in Figure 5. A spiral spring 52 is positioned in this chamber, the inner end of the spring being secured to the hub portion 46a of the pulley 46 and the outer end of the spring being secured in a groove 53 formed in the outer wall of the recess 51 of the pulley 47. The pulley 47 is provided with a stop lug 54 adapted to cooperate with shoulders 50a and 50b on the pulley 46 to limit relative rotation between the two pulleys. As shown in Figures 6 and 7, pulley 46 is provided with an arcuate serrated area 55 and pulley 47 is provided with a smaller but complementary serrated area 56. As shown in Figure 5, the end of the shaft 14 is threaded and a lock washer 58 and nut 59 hold the pulley 47 on the shaft 14.

In the operation of the device, the pulleys 46 and 47 may be rotated relative to each other between two terminal positions shown in broken lines in Figure 6 and designated generally at 60 and 61. In position 60 the spring 52 is relaxed and in position 61 the spring 52 is fully wound. Engagement of the lug 54 with one of the stop shoulders 50a or 50b prevents relative rotation of the pulleys 46 and 47 much beyond these terminal positions. Of course the pulleys may be rotated relative to each other to any intermediate position wherein the spring is partially wound, as for example, the intermediate position designated generally at 62.

When the windshield wiper drive apparatus is to be installed in a vehicle the pulleys 46 and 47 are rotated relative to each other to the fully wound position designated at 61 in Figure 6, and the nut 59 is tightened to force the serrated areas 55 and 56 into engagement so that the pulleys are frictionally locked together against relative rotation. With the parts in this position the drive apparatus is installed in the vehicle, the cables being slack enough to permit proper installation and positioning of the parts. When the installation is complete the nut 59 is loosened to permit the spring 52 to unwind partially, so that the relative position of pulleys may then be as shown at 62 in Figure 6, for example. This relative rotation between the pulleys will take the slack out of the cables and will also compress the springs 41. The strength of the spring 52 is greater than the combined strength of the two springs 41 which it opposes, preferably being severaly times greater, so that the springs 41 are fully compressed to the position of Figure 4 and the cables are drawn taut. With the parts in this position the nut 59 is tightened to lock the pulleys 46 and 47 against relative rotation.

After a period of use, should the cables become slack for any reason, it is only necessary to loosen the nut 59 and the spring 52 will automatically tighten the cables. In the event the windshield wiper arm 16 is moved to rotate the shaft 14 while the motor 20 is not operating, the springs 41 will expand as shown in Figure 2 to keep the cables taut, and a similar expansion of the springs will occur should the arm 16 or the blade 17 strike an obstruction while the motor 20 is operating. The secondary tensioning means comprising the springs 41 thus exert a constant tension to prevent the cables from coming off the idler pulleys 39 and 40. In the event the cables are connected directly between the motor and the shaft 14 and the idler pulleys are eliminated, the secondary tensioning means may also be eliminated. The cables may be tightened after installation, or in servicing the vehicle after a period of use, by means of the primary tensioning means alone, comprising the pulleys 46 and 47.

While I have shown and described one embodiment of my invention, it is subject to many modifications. Changes, therefore, in the construction and arrangement may be made without departing from the spirit and scope of the invention as set forth in the appended claims.

I claim:

1. In windshield wiper drive apparatus having power means comprising drive means and an output shaft for operating the wiper and a pair of flexible cables extending between said drive means and shaft, means for tensioning said cables, including: a first tensioning member connected to one of said cables at one end thereof; a second tensioning member adjacent said first member and connected to the other of said cables at the adjacent end thereof, said members being rotatable relative to each other; spring means having opposite ends interconnecting said members for rotating at least one of said members relative to the other to tighen said cables; and readily releasable means for locking said members against relative rotation.

2. In windshield wiper drive apparatus having a motor, an output shaft for operating the wiper and a pair of flexible cables extending between said motor and shaft, means for tensioning said cables, including: a first tensioning member fixedly mounted on said shaft and connected to one of said cables; a second tensioning member rotatably mounted on said shaft adjacent said first member and connected to the other of said cables; a spring having opposite ends interconnecting said members for causing rotation therebetween to tighten said cables; and readily releasable means for locking said rotatable member to said fixed member.

3. Apparatus of the character claimed in claim 2, wherein said tensioning members have complementary serrated areas adapted to engage to lock said members together, and wherein said locking means comprises a pressure member on said shaft to hold said members in abutting relation with the complementary serrated areas engaged.

4. In windshield wiper drive apparatus having drive means, an output shaft for operating the wiper and a pair of flexible cables extending between said drive means and shaft, means for tensioning said cables, including: a first pulley fixedly mounted on said shaft and connected to one of said cables; a second pulley rotatably mounted on said shaft adjacent said first pulley and connected to the other of said cables; spring means interconnecting said pulleys for causing relative rotation therebetween to tighten said cables; and readily releasable means comprising a pressure member movable axially on said shaft for locking the rotatable pulley to the fixed pulley.

5. Apparatus of the character claimed in claim 4, wherein said pulleys are provided with complementary recesses forming a chamber, and wherein said spring means comprises a spiral spring positioned in said chamber and having its opposite ends connected to the respective pulleys.

6. Windshield wiper drive apparatus of the character described, including: a motor having an operating member; an output shaft for operating the wiper; a pair of flexible cables extending between said operating members and shaft; primary cable tensioning means mounted on said shaft and connected to said cables at one end thereof; and secondary cable tensioning means mounted on said operating member and connected to said cables at the other end thereof, said primary means having more strength for tensioning said cables than said secondary means to maintain said secondary means normally under stress.

7. Apparatus of the character claimed in claim 6, wherein said secondary cable tensioning means comprise coil springs connected between the ends of said cables and said operating member, and wherein the first cable tensioning member has several times the strength of said coil springs.

8. Windshield wiper drive apparatus of the character described, including: a motor having an operating member; an output shaft for operating the wiper; a pair of flexible cables extending between said operating member and shaft; primary cable tensioning means comprising a first pulley fixedly mounted on said shaft and connected to one of said cables, a second pulley rotatably mounted on said shaft adjacent said first pulley and connected to the other of said cables, said pulleys being provided with complementary recesses forming a chamber, a spiral spring positioned in said chamber and interconnecting said pulleys for causing relative rotation therebetween to tighten said cables, and readily releasable locking means comprising a pressure member on said shaft having threadable connection therewith for locking said rotatable pulley to said fixed pulley; and secondary cable tensioning means comprising coil springs connected between the other ends of said cables and said operating member, the strength of said spiral spring being several times the strength of said coil springs.

9. Windshield wiper drive apparatus of the character described, including: drive means having an operating member; an output shaft for operating the wiper; a pair of flexible cables extending between said operating member and shaft; primary cable tensioning means comprising a first tensioning member fixedly mounted on said shaft and connected to one of said cables at one end thereof, a second tensioning member rotatably mounted on said shaft adjacent said first member and connected to the other of said cables at one end thereof, and spring means interconnecting said members for causing rotation therebetween to tighten said cables; readily releasable means for locking said rotatable member to said fixed member; and secondary cable tensioning means connected to said cables at the other end thereof.

10. Windshield wiper drive apparatus linkage comprising, in combination, a first linkage member; a first tensioning member connected to said linkage member at one end thereof; a second linkage member; a second tensioning member adjacent said first tensioning member and connected to said second linkage member at the adjacent end thereof, said tensioning members being rotatable relative to each other; spring means having opposite ends interconnecting said tensioning members for rotating at least one tensioning member relative to the other to tighten said linkage members; and readily releasable means for locking said tensioning members against relative rotation.

CLARENCE P. McCLELLAND.

References Cited in the file of this patent

UNITED STATES PATENTS

| Number | Name | Date |
|---|---|---|
| 1,922,861 | Prendergast | Aug. 15, 1933 |
| 2,167,230 | Avigdor | July 25, 1939 |
| 2,212,823 | Bulk | Aug. 27, 1940 |
| 2,371,130 | Cushman | Mar. 13, 1945 |
| 2,515,274 | Stevenson | July 18, 1950 |
| 2,547,285 | Rappl | Apr. 3, 1951 |